United States Patent Office.

A. J. HOBBS, OF VAN WIRT, GEORGIA.

Letters Patent No. 79,352, dated June 30, 1868.

IMPROVED MEDICAL COMPOUND.

The Schedule referred to in these Letters Patent and making part of the same.

TO ALL WHOM IT MAY CONCERN:

Be it known that I, A. J. HOBBS, of Van Wirt, in the county of Polk, and State of Georgia, have invented a new and improved Medical Compound; and I do hereby declare that the following is a full, clear, and exact description thereof, which will enable others skilled in the art to make and use the same.

The object of this invention is to provide a vegetable medicine for treating gonorrhea, syphilis, and other venereal diseases, and also for the treatment of uterine affections, and other disorders of the female genital organs.

It is also a valuable tonic, to brace the system when reduced by excessive venery, or debilitated by chills and fevers, or other malarious fevers. It is also an excellent palliative for rheumatism and kindred disorders.

It consists of a strong decoction of the following roots and barks, the said decoction being obtained by boiling equal quantities (by weight) of the roots and barks set forth in the following, and adding to the decoction thus obtained a certain quantity of spirits, as rum or whiskey, in the proportion of one part of spirits to three parts of the decoction.

The quantity of water to be used in obtaining the decoction is about one gallon of water to two pounds of the roots and barks in the aggregate, though these proportions may be varied to any reasonable extent without materially impairing the efficiency of the compound.

The vegetable ingredients are as follows:

White-ash root.
Thorn-ash root.
Red-shank root.
Shoe-make (sumach) root.
Sarsaparilla root.
Silk-weed root.
Blackberry-briar root.
Shoe-string root.
Sassafras root.
May-apple root.
Sweet-shrub root.
Cherry-tree bark.
Dog-wood bark.
Butterfly-root.

Thus, a simple and efficacious remedy for venereal and other disorders is provided, which is entirely free from mercurial and other mineral substances.

The dose is from three to five tablespoonfuls per day for adults.

Having thus described my invention, I claim as new, and desire to secure by Letters Patent—

The medicinal compound, substantially as above set forth.

A. J. HOBBS.

Witnesses:
  W. W. SIMPSON,
  BATT JONES.